US00RE34235E

United States Patent [19]

Cooper et al.

[11] E Patent Number: Re. 34,235

[45] Reissued Date of Patent: Apr. 27, 1993

[54] SEALING PLUG

[75] Inventors: Gordon C. Cooper, Belper; Douglas Dawson, deceased, late Derby, by Margaret Dawson, executrix, Allestree, all of England

[73] Assignee: Rolls-Royce plc, London, England

[21] Appl. No.: 614,036

[22] Filed: Nov. 16, 1990

Related U.S. Patent Documents

Reissue of:

[64] Patent No.: 4,492,381
Issued: Jan. 8, 1985
Appl. No.: 631,748
Filed: Jul. 17, 1984

U.S. Applications:

[63] Continuation of Ser. No. 393,282, Aug. 14, 1989, abandoned.

[30] Foreign Application Priority Data

Sep. 21, 1983 [GB] United Kingdom ..... 8325268

[51] Int. Cl.[5] ..... F16J 15/00

[52] U.S. Cl. ..... 277/2; 277/9; 277/150

[58] Field of Search ..... 277/2, 9, 9.5, 11, 177, 277/150; 285/90, 91, 85; 220/DIG. 20, 304, 293, 295

[56] References Cited

U.S. PATENT DOCUMENTS

| | | | |
|---|---|---|---|
| 2,196,953 | 4/1940 | Bohmer, Jr. et al. | 277/2 X |
| 2,757,995 | 8/1956 | Young | 277/150 X |
| 2,762,310 | 9/1956 | Eklund | 277/150 X |
| 3,350,103 | 10/1967 | Ahlstone | 277/150 X |
| 3,587,405 | 11/1968 | Holmes | 277/2 |
| 3,711,060 | 1/1973 | Weinstein | 277/9 X |
| 3,778,881 | 12/1973 | Knapp | 277/9 X |
| 3,947,944 | 4/1976 | Washington | 277/9.5 X |
| 4,046,387 | 9/1976 | Lee . | |
| 4,103,900 | 8/1978 | Wittersheim | 277/2 |
| 4,407,518 | 10/1983 | Moskowitz et al. | 277/2 X |
| 4,453,698 | 6/1984 | DeFrees | 277/177 X |

FOREIGN PATENT DOCUMENTS

| | | |
|---|---|---|
| 1227494 | 6/1969 | United Kingdom . |
| 2053401 | 7/1980 | United Kingdom . |
| 2058986 | 9/1980 | United Kingdom . |

*Primary Examiner*—William A. Cuchlinski, Jr.
*Assistant Examiner*—Scott W. Cummings
*Attorney, Agent, or Firm*—Cushman, Darby & Cushman

[57] ABSTRACT

A sealing plug *assembly* includes a plug and a housing, the plug and the housing including co-operating [means] *structures* whereby they may be secured together, the plug including two circumferentially extending grooves within which O ring seals are located, and the housing [including an aperture] *having a bore* within which the plug is adapted to be located, the housing also including a spring loaded radially extending pin which projects into the [aperture] *bore* and which is adapted to project into either of the grooves within the plug if an O ring is omitted, thus preventing the plug being secured with the housing by the co-operating [means] *structures*.

5 Claims, 2 Drawing Sheets

SEALING PLUG

Matter enclosed in heavy brackets [ ] appears in the original patent but forms no part of this reissue specification; matter printed in italics indicates the additions made by reissue.

*This is a continuation of application Ser. No. 07/393,282, filed Aug. 14, 1989, now abandoned, which is for the reissue of U.S. Pat. No. 4,492,381, issued Jan. 8, 1985.*

This invention relates to a sealing plug and more particularly to such a device suitable for use in an oil system of a gas turbine engine.

It is well known in the gas turbine art to use magnetic chip detectors in the oil system. Such chip detectors comprise a magnetic plug which serves to give an early indication of engine component failures. The magnetic chip detector is usually *mechanically* secured within a [plug which is in turn mechanically secured to] *housing in* the engine gear box by means of a screw connection or bayonet type fitting. It is essential therefore that the joint between the plug and the *housing in the* gear box is fluid tight to prevent leakage during engine operation and such sealing is invariably accomplished by means of sealing washers more commonly known as O ring seals which are adapted to provide a flexible seal between the two members.

Unfortunately, however it has been found that occasionally when the magnetic chip detector has been removed from the engine for inspection it has been thereafter replaced without the necessary O rings in place. As a consequence lubricating oil has leaked from around the plug resulting in the engine having to be prematurely shut down during flight to prevent catastrophic damage.

The object of the present invention is to provide a sealing plug in which the aforementioned problem may be substantially eliminated.

According to the present invention a sealing plug *assembly* comprising a plug member [and] *having a radially outermost cylindrical surface which defines at least one circumferentially extending groove for receipt of an O ring seal therein,* a housing[, and housing including] *for the plug member which defines a bore for location of* the plug [and housing including] *member therein on the plug member* co-operating means *on the plug member and the housing,* whereby [they] *the plug member* may be secured [together the radially outermost cylindrical surface of the plug including at least one circumferentially extending groove within which an O ring seal may be disposed, the housing including an aperture within which the plug is adapted to be located,] *within the housing,* the housing also including at least one radially extending pin [which projects into the aperture] *moveable between a first position projecting into the bore of the housing and a second position in which it does not so project* and [which] *the pin* is adapted to be located within the at least one circumferentially extending groove when the O ring is omitted from the assembly [such as] *thereby* to prevent the plug *member* being secured within the housing by the co-operating means.

Preferably the plug includes two circumferentially extending grooves within each of which an O ring is located.

The at least one radially extending pin is provided with spring means such that it is urged radially inwardly into the [aperture] *bore.*

Preferably the co-operating means which secure the plug within the housing consists of a bayonet type fitting.

Preferably the plug includes a magnetic chip detector for use within the oil system of a gas turbine engine.

For better understanding of the invention an embodiment thereof will be more particularly described by way of example only and with reference to the accompanying drawings in which.

Figure 1:
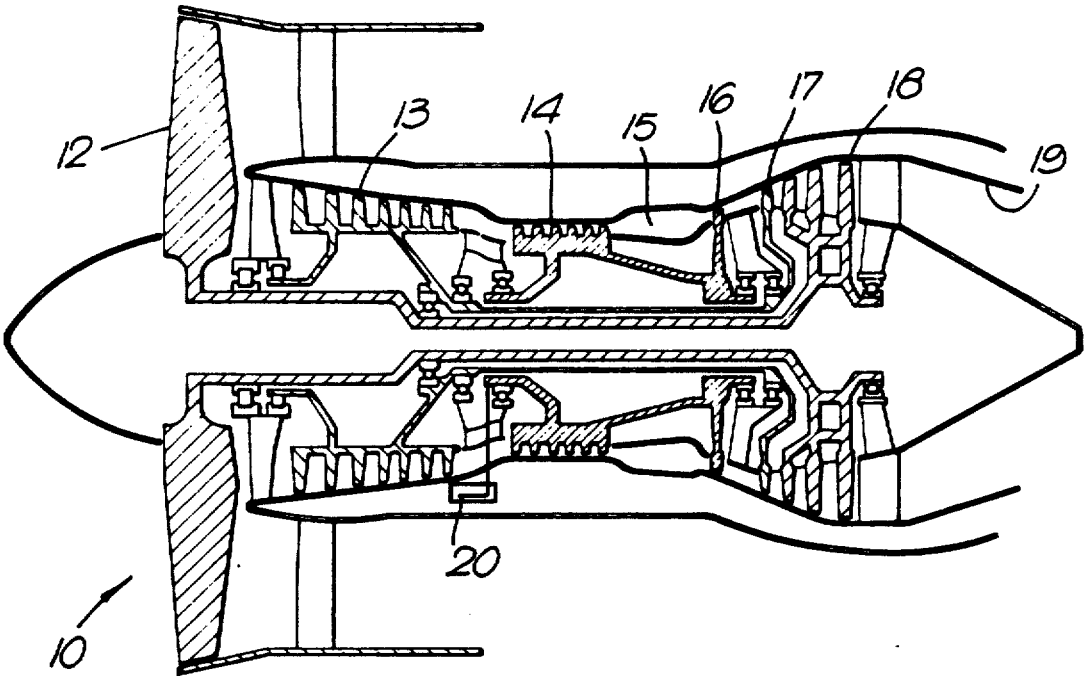
FIG. 1 shows diagrammatic side view of a ducted fan type gas turbine engine including oil system incorporating *a* sealing plug made in accordance with the present invention.

Referring to the drawings a ducted fan type gas turbine engine shown generally at 10 comprises in flow series fan 12, intermediate pressure compressor 13, high pressure compressor 14, combustion equipment 15, high pressure turbine 16, intermediate pressure turbine 17 and low pressure turbine 18 the engine terminating in an exhaust nozzle 19. The respective high, intermediate and low pressure rotors [being] *are* mounted upon the engine main shafts which are rotatably mounted within bearings.

The engine [bearing] *bearings* which [supports] *support* the respective main shafts are all lubricated from a central oil supply *comprising* the oil tank 20 which includes a magnetic chip detector not shown in this drawing.

Figure 2:
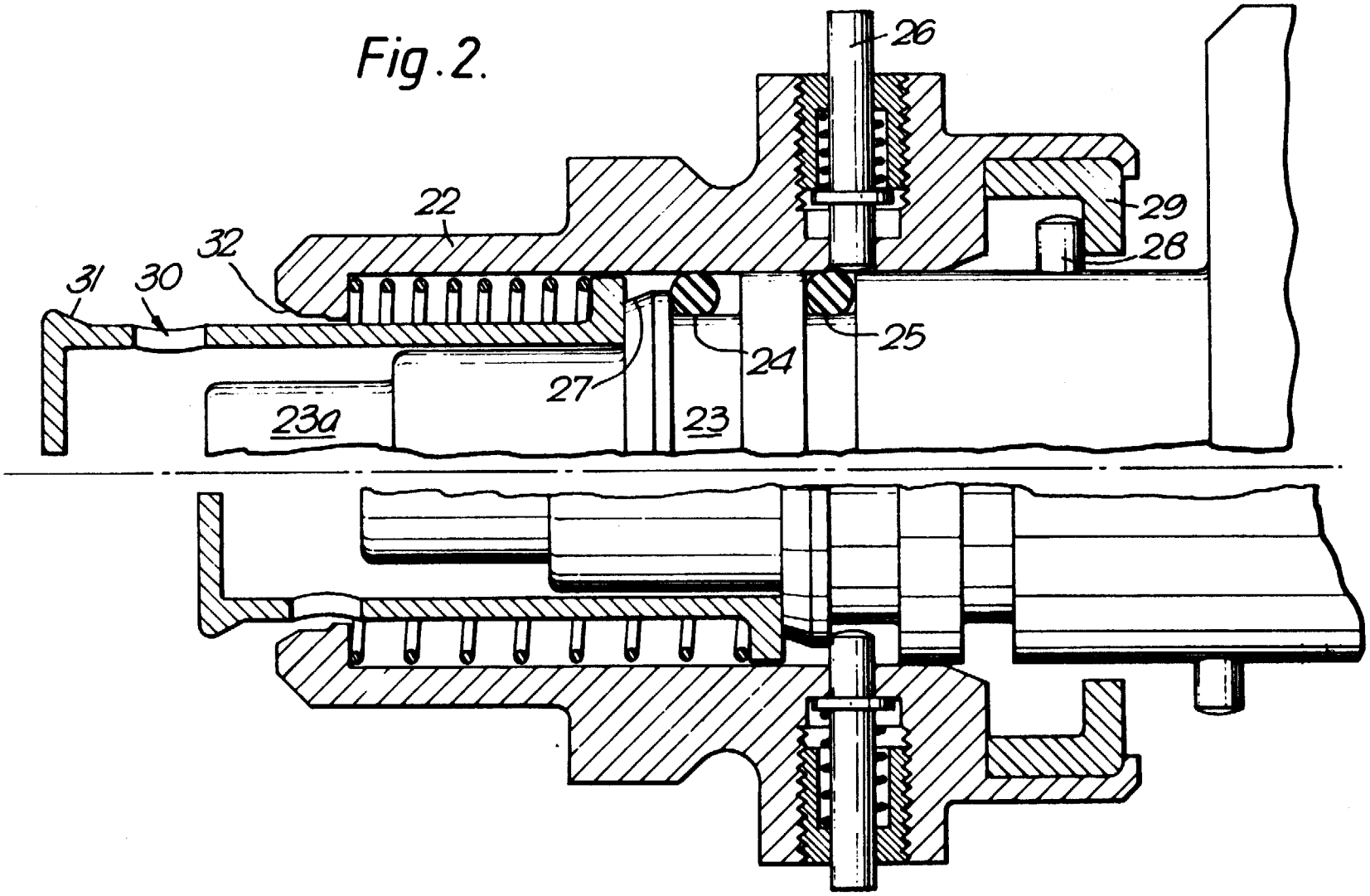
FIG. 2 shows a cross-sectional view the sealing plug *assembly.*

FIG. 2 of the drawings shows a cross-sectional view of the sealing plug *assembly* in two positions. The upper portion of the drawing shows the plug properly assembled *into its housing* in a fluid tight manner with the O rings included. The lower portion of the drawing shows the sealing plug improperly assembled with O rings omitted.

The sealing plug *assembly* shown at FIG. 2 [consits] *consists* of a housing 22 *having a bore or internal chamber 22a* within which the plug 23 is located, the plug including a magnetic chip detector 23a and having two grooves 24 and 25 included [within] *in* its cylindrical surface within which O rings are located which form a fluid [type] *tight* seal between the housing 22 and the plug 23. As will be seen from the drawings, if the O rings are correctly located with the grooves 24 and 25 upon assembly of the plug 23 into the housing 22, the radially extending spring loaded pin 26 will be displaced radially outwards by firstly riding up the chamfered portion 27 of the plug 23 and thereafter over the O rings. The plug [therefor] *therefore* may be pushed completely home and located in the preferred location by means of a bayonet type fitting, which essentially consists of pins 28 located upon the plug which engage behind portions 29 secured to the housing 22.

If however the O rings are omitted from the assembly as shown in the lower half of FIG. 2, it will be seen that the spring loaded pin 26 will be urged into the empty groove 24 and thus prevent the plug 23 being pushed fully home such that the bayonet type fitting cannot serve to lock the two members together. It will be appreciated that the spring loaded pin 26 will prevent the sealing plug being completely assembled if either *or both* of the O rings[, or both rings] are omitted from the assembly therefore ensuring the provision of a fluid [type] *tight* joint.

If the plug is completely omitted from the housing the device is automatically sealed by means of the spring urged member 30 which is automatically displaced such that face 31 comes into sealing engagement 32 and therefore makes the assembly fluid tight.

We claim:

1. A sealing plug *assembly* comprising a plug member [and] *having a radially outermost cylindrical surface, said surface defining at least one circumferentially extending groove for receipt of an O ring seal therein,* a housing [the] *for said plug member, said housing defining a bore for location of said* plug [and housing including] *member therein,* co-operating means *on said plug member and said housing* whereby [the] *said plug member* may be secured [together the radially outermost cylindrical surface of the plug including at least one circumferentially extending groove within which an O ring seal may be disposed, the housing including an aperture within which the plug is adapted to be located] *within said housing, said housing further including at least one radially extending pin moveable between a first position projecting into said base of said housing and a second position in which it does not so project, said pin being adapted to locate* within [the] *said* at least one circumferentially extending groove when [the] *said* O ring is omitted from the assembly [such as] *thereby* to prevent [the] *said* plug *member* being secured within [the] *said* housing by [the] *said* co-operating means.

2. A sealing plug *assembly* as claimed in claim 1 in which the plug *member* includes two circumferentially extending grooves within each of which an O ring seal is located.

3. A sealing plug *assembly* as claimed in claim 1 in which the at least one radially extending pin is provided with spring means such that it is urged radially inwardly into the [aperture] *bore.*

4. A sealing plug [device] *assembly* as claimed in claim 1 in which the co-operating means which secure the plug *member* within the housing consists of a bayonet type fitting.

5. A sealing plug *assembly* as claimed in claim 1 which includes a magnetic chip detector for use within the oil system of a gas turbine engine.

* * * * *